United States Patent [19]

Maeda

[11] Patent Number: 4,467,749
[45] Date of Patent: Aug. 28, 1984

[54] FLOW CONTROL DEVICE OF A HELICALLY-SHAPED INTAKE PORT

[75] Inventor: Yorishige Maeda, Toyota, Japan

[73] Assignee: Toyota Jidosha Kabushiki Kaisha, Aichi, Japan

[21] Appl. No.: 394,872

[22] Filed: Jul. 2, 1982

[30] Foreign Application Priority Data

| Jul. 15, 1981 | [JP] | Japan | 56-109224 |
| Jul. 15, 1981 | [JP] | Japan | 56-109225 |
| Jul. 15, 1981 | [JP] | Japan | 56-103782[U] |
| Jul. 15, 1981 | [JP] | Japan | 56-103783[U] |

[51] Int. Cl.³ ............................................. F02B 31/00
[52] U.S. Cl. ................................. 123/188 M; 123/306
[58] Field of Search ............... 123/52 M, 188 M, 306, 123/308, 432

[56] References Cited

U.S. PATENT DOCUMENTS

| 3,850,479 | 11/1974 | Boyhont et al. | 302/29 |
| 4,174,686 | 11/1979 | Shimizu et al. | 123/188 M |
| 4,196,701 | 4/1980 | Tamura et al. | 123/188 M |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanish et al. | 123/188 M |
| 4,411,226 | 10/1983 | Okumura et al. | 123/188 M |

FOREIGN PATENT DOCUMENTS

| 2059008 | 6/1972 | Fed. Rep. of Germany . | |
| 2308327 | 10/1973 | Fed. Rep. of Germany | 123/188 M |
| 143289 | 8/1980 | German Democratic Rep. | 123/188 M |
| 127113 | 9/1977 | Japan | 123/188 M |
| 58129 | 5/1979 | Japan . | |
| 54922 | 5/1981 | Japan . | |
| 68519 | 4/1982 | Japan . | |

*Primary Examiner*—Craig R. Feinberg
*Assistant Examiner*—W. R. Wolfe
*Attorney, Agent, or Firm*—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. The slide valve, actuated by lubricating oil, is arranged in the bypass passage. The slide valve is opened when the amount of air fed into the cylinder of an engine is increased beyond a predetermined value.

20 Claims, 17 Drawing Figures

4,467,749

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closed type flow control valve, actuated by an actuator, is arranged in the bypass passage and opened under the operation of the actuator when the amount of air fed into the cylinder of the engine is larger than a predetermined amount. In this flow control device, when the amount of air fed into the cylinder of the engine is large, that is, when the engine is operating under a heavy load at a high speed, since a part of air introduced into the inlet passage portion is fed into the helical portion of the helically-shaped intake port via the bypass passage, the flow resistance of the helically-shaped intake port is reduced and, thus, it is possible to obtain a high volumetric efficiency. However, this flow control device merely indicates a basic principle of operation and, therefore, in order to put such a flow control device into the practical use, various problems to be solved are present as to how to reduce the manufacturing time and the manufacturing cost; how to easily manufacture the flow control device; and how to obtain a reliable operation of the flow control device.

SUMMARY OF THE INVENTION

An object of the present invention is to provide a flow control device of a helically-shaped intake port having a construction suited for putting the basic principle of operation into practical use.

According to the present invention, there is provided a device for controlling the flow in a helically-shaped intake port of an internal combustion engine, a said intake port comprising a helical portion formed around an intake valve, and a substantially straight inlet passage portion tangentially connected to the helical portion and having a helix terminating portion, said device comprising: a lubricating oil source; a bypass passage branched off from the inlet passage portion and connected to the helix terminating portion of the helical portion; a normal closed slide valve having an oil pressure chamber therein and a valve body which is actuated in response to a change in the pressure of lubricating oil in said oil pressure chamber and is able to project into said bypass passage for controlling the flow area of said bypass passage; and control means for controlling the fluid connection between said lubricating oil source and said oil pressure chamber in response to a change in the amount of air fed into the intake port to open said slide valve when said amount of air is increased beyond a predetermined value.

The present invention may be more fully understand from the description of preferred embodiments of the invention set forth below, together with the accompanying drawings.

DESCRIPTION OF PREFERRED EMBODIMENTS

Figure 1:
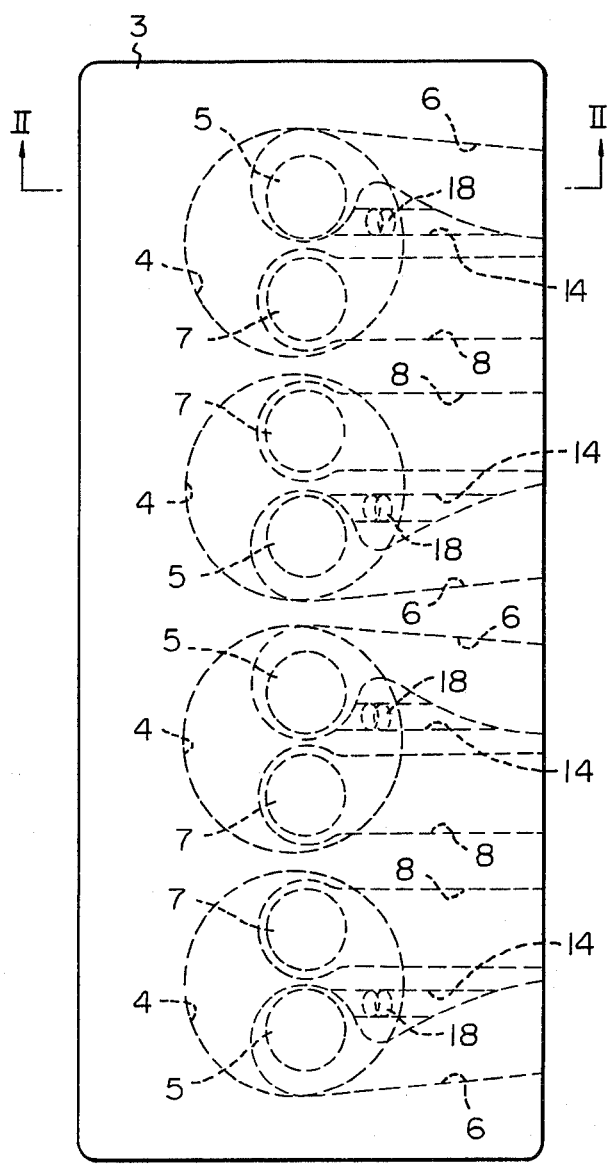
FIG. 1 is a plan view of an internal combustion engine according to the present invention.
Figure 2:
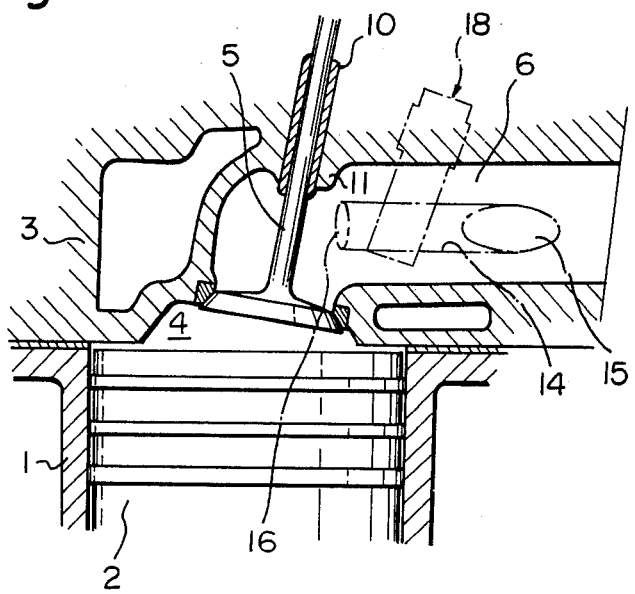
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 3:
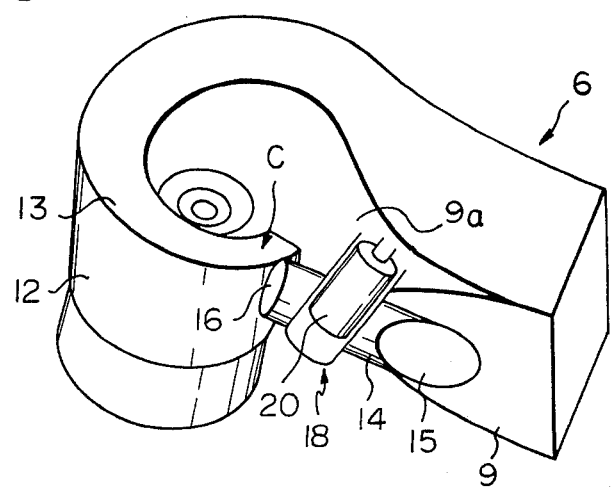
FIG. 3 is a perspective view schematically illustrating the shape of a helically-shaped-intake port.
Figure 4:
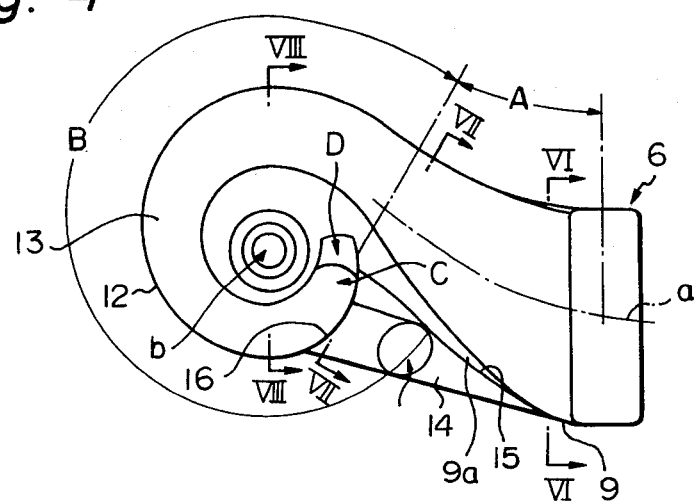
FIG. 4 is a plan view of FIG. 3.
Figure 5:
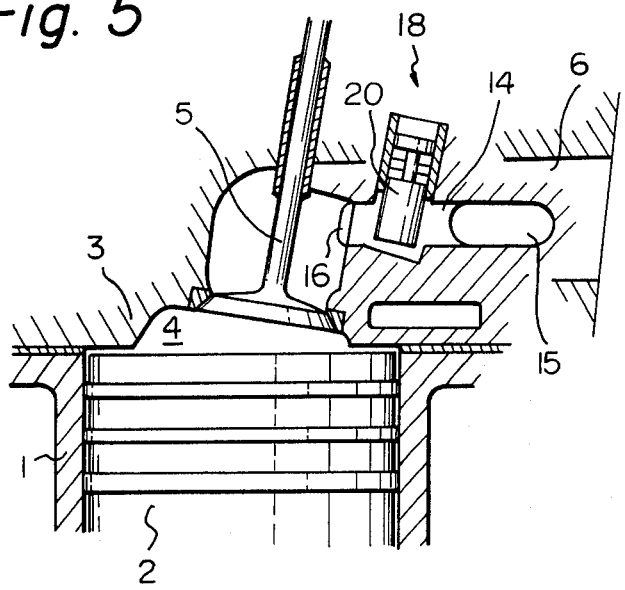
FIG. 5 is a cross-sectional view taken along the bypass passage in FIG. 3.
Figure 6:
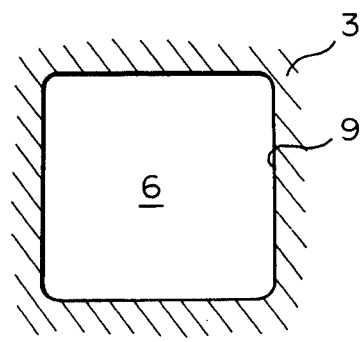
FIG. 6 is a cross-sectional view taken along the line VI—VI in FIG. 4.
Figure 7:
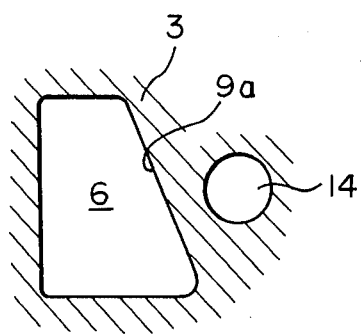
FIG. 7 is a cross-sectional view taken along the line VII—VII in FIG. 4.
Figure 8:
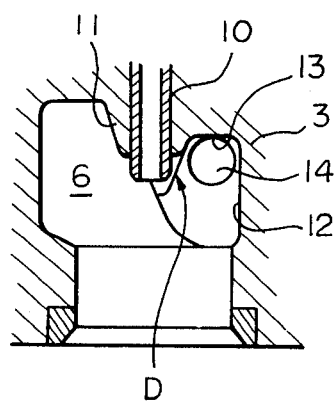
FIG. 8 is a cross-sectional view taken along the line VIII—VIII in FIG. 4.

FIGS. 3 through 5 schematically illustrate the shape of the helically-shaped intake port 6 illustrated in FIG. 2. As illustrated in FIG. 4, the helically-shaped intake port 6 comprises an inlet passage portion A, the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helix axis b, has on its upper portion an inclined wall portion 9a which is arranged to be directed downwards. The width of the inclined wall portion 9a is gradually increased towards the helical portion B, and as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B. In addition, the upper wall 13 of the helical portion B is connected to a steeply inclined wall D at the helix terminating portion C of the helical portion B.

Figure 9:
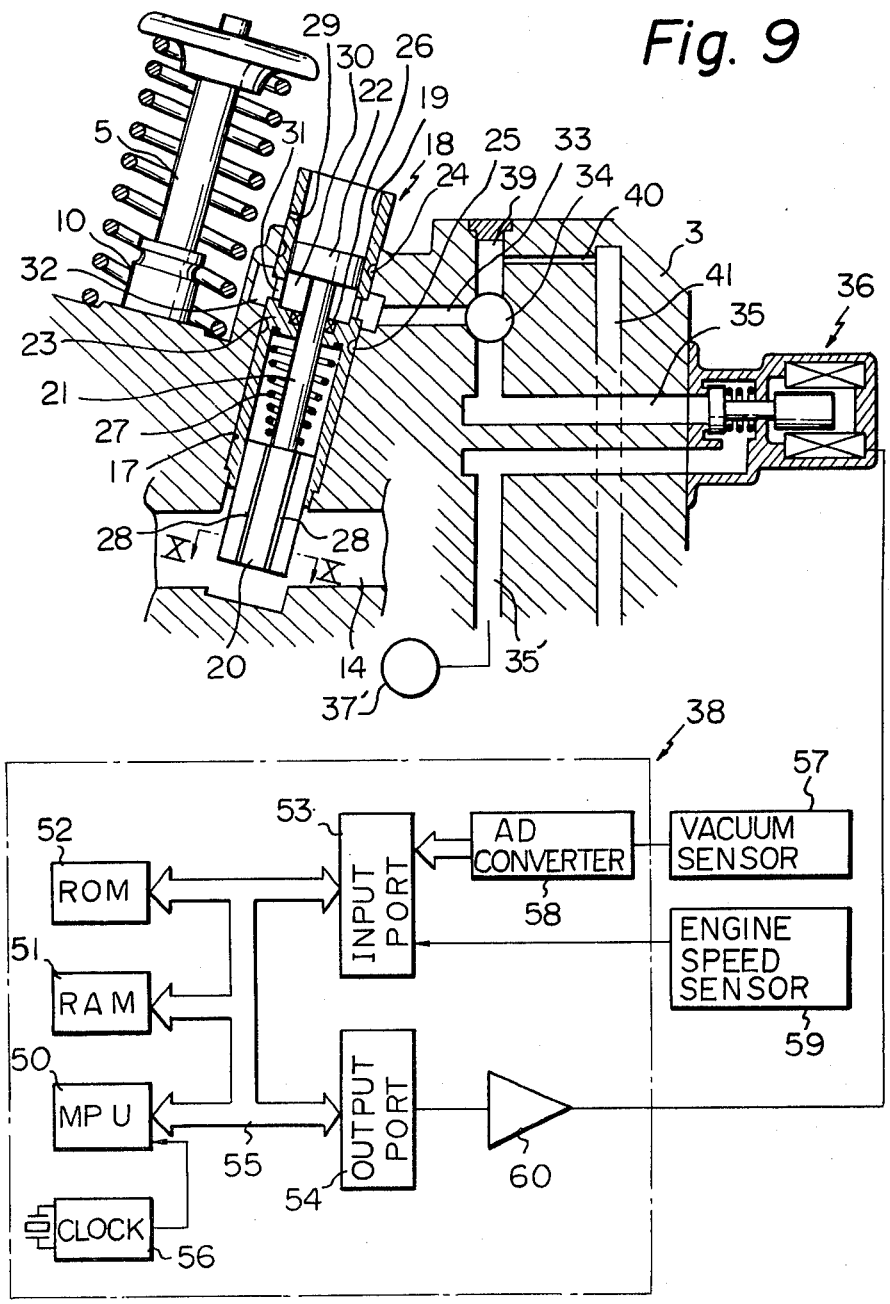
FIG. 9 is a cross-sectional side view of an embodiment of a flow control device according to the present invention.
Figure 10:
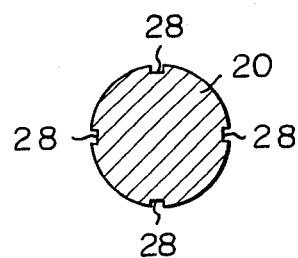
FIG. 10 is a cross-sectional view taken along the line X—X in FIG. 9.

As illustrating in FIGS. 1 through 5, bypass passages 14, branched off the inlet passage portions A of the corresponding intake ports 6 and having a substantially uniform cross-section, are formed in the cylinder head 3, each of the bypass passages 14 connecting to the helix terminating portion C of the corresponding intake port 6. Each of the inlet openings 15 of the bypass passages 14 is formed on the side wall 9 at a position located near the inlet open end of the inlet passage portion A of the corresponding intake port 6. Each of the outlet openings 16 of the bypass passages 14 is formed on the upper end portion of the side wall 12 at the helix terminating portion C of the corresponding intake port 6. In addition, valve insertion bores 17 extending across the corresponding bypass passages 14, are formed in the cylinder head 3, and slide valves 18, each functioning as a flow control valve, are inserted into the corresponding valve insertion bores 17. Referring to FIG. 9, the slide valve 18 comprises a hollow sleeve 19 fitted into the valve insertion bore 17, a valve body 20 slidably inserted into the hollow sleeve 19 and being able to project into the bypass passage 14, and a piston 22 connected to the valve body 20 via a rod 21. The rod 21 extends through a partition 23 formed in the hollow sleeve 19. A pair of O rings 24, 25 is inserted between the outer circumferential wall of the hollow sleeve 19 and the inner circumferential wall of the valve insertion bore 17, and a seal member 26, which tightly contacts with the rod 21, is mounted on the partition 23. A compression spring 27 for biasing the valve body 20 downward is inserted between the valve body 20 and the partition 23, and a plurality of air escaping grooves 28 is formed on the outer circumferential wall of the valve body 20 as illustrated in FIGS. 9 and 10. An opening 29 is formed in the upper portion of the hollow sleeve 19, and in the embodiment illustrated in FIG. 9, the opening 29 is directed to the stem of the intake valve 5, which projects upwardly from the stem guide 10. An oil pressure chamber 30 formed between the piston 22 and the partition 23 is connected to an annular oil passage 32 formed around the hollow sleeve 19 via oil introduction bores 31 formed in the hollow sleeve 19. The annular oil passage 32 is connected via an oil passage 33 to an oil distribution passage 34 which is connected to the oil pressure chambers 30 of the other cylinders. The oil distribution passage 34 is connected to the lubricating oil feed pump 37, driven by the engine, via a downwardly extending oil feed passage 35, an electromagnetic control valve 36, and an oil feed passage 35'. The solenoid of the electromagnetic control valve 36 is connected to the output terminal of an electronic control unit 38. On the other hand, the oil distribution passage 34 is connected to the lubricating oil reservoir (not shown) via an upwardly extending oil passage 39, a choke passage 40, having a small cross-sectional area, and an oil return passage 41. From FIG. 9, it is understood that the choke passage 40 is arranged above the oil distribution passage 34 and the oil pressure chamber 30.

The electronic control unit 38 is constructed as a digital computer and comprises a microprocessor (MPU) 50 carrying out the arithmetic and logic processing, a random-access memory (RAM) 51, a read-only memory (ROM) 52 storing a predetermined control program and arithmetic constant therein, an input port 53, and an output port 54. The MPU 50, the RAM 51, the ROM 52, the input port 53, and the output port 54 are interconnected to each other via a bidirectional bus 55. In addition, the electronic control unit 38 comprises a clock generator 56 generating various clock signals. A vacuum sensor 57 is connected to the input port 53 via an AD converter 58, and an engine speed sensor 59 is connected to the input port 53. The vacuum sensor 57 produces an output voltage which is proportional to the level of vacuum produced in the intake port 6 (FIG. 2). The output voltage of the vacuum sensor 57 is converted to the corresponding binary code in the AD converter 58, and the binary code is input into the MPU 50 via the input port 53 and the bus 55. The engine speed sensor 59 produces an output pulse everytime the crank-shaft (not shown) of the engine rotates by a fixed angle, and the output pulse of the engine speed sensor 59 is input into the MPU 50 via the input port 53 and the bus 55. The output port 54 is connected to the solenoid of the electromagnetic control valve 36 via a power amplifier 60.

Figure 11:
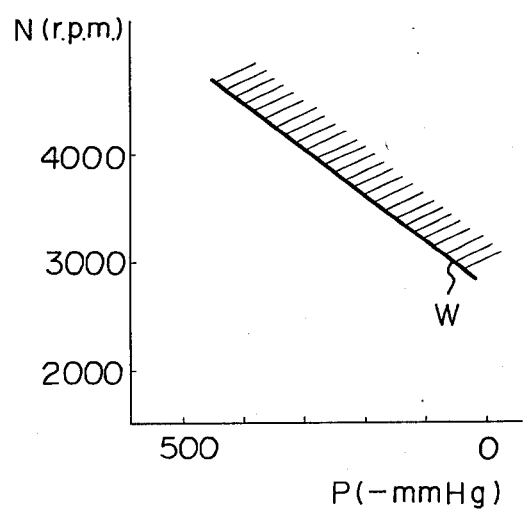
FIG. 11 is a diagram illustrating the region where the solenoid of the electromagnetic control valve is energized.

FIG. 11 illustrates an engine operating region in which the solenoid of the electromagnetic control valve 36 is energized. In FIG. 11, the ordinate N indicates the engine speed (r.p.m.), and the abscissa P indicates vacuum (-mmHg) produced in the intake port 6. In addition, in FIG. 11, the solenoid of the electromagnetic control valve 36 is energized in the region illustrated by the hatching above the solid line W. The relationship W between the engine speed N and the vacuum P is stored in the ROM 52 in the form of a function or a data table. In the MPU 50, the engine speed N is calculated from the output signal of the engine speed sensor 59, and the engine speed N and the vacuum P measured by the vacuum sensor 57, are compared with the relationship W stored in the ROM 52. At this time, if the point on FIG. 11, which is determined by the engine speed N and the vacuum P is in the region illustrated by the hatching, data indicating that the solenoid of the electromagnetic control valve 36 should be energized, is written in the output port 54. As a result of this, since the solenoid of the electromagnetic control valve 36 is energized, the electromagnetic control valve 36 opens the oil feed passage 35, and thus, lubricating oil under pressure is fed into the oil distribution passage 34 via the oil feed passage 35', the electromagnetic control valve 36, and the oil feed passage 35. Then, the lubricating oil is, on one hand, returned to the lubricating oil reservoir via the choke passage 40 and the oil return passage 41, and, on the other hand, flows into the oil pressure chamber 30 via the annular oil passage 32. At this time, since the cross-sectional area of the choke passage 40 is considerably small, the high pressure of the lubricating oil in the oil distribution passage 34 is maintained. Consequently, since the piston 22 moves upward against the compression spring 27, the valve body 20 moves upward and opens the bypass passage 14. As mentioned above, since the air escaping grooves 28 are formed on the outer circumferential wall of the valve body 20, there is no danger that the interior chamber of the hollow sleeve 19, which is formed between the valve body 20 and the partition 23, is compressed when the valve body 20 moves upward. Therefore, the valve body 20 is able to easily move upward. When the piston 22 moves upward, since the opening 29 becomes open to the oil pressure chamber 30, the lubricating oil in the oil pressure chamber 30 flows out from the opening 29. As a result of this, since the pressure of the lubricating oil in the oil pressure chamber 30 is reduced, the piston 22 remains stopped at a position where the piston 22 uncovers the opening 29. Therefore, the opening 29 functions as a stop for restricting the uppermost position of the piston 22. In addition, as mentioned above, since the opening 29 is directed to the stem of the intake valve 5, the lubrication between the valve guide 10 and the stem of the intake valve 5 is carried out by the lubricating oil spouted from the opening 29. Furthermore, instead of directing the opening 29 to the step of the intake valve 5, the opening 29 may be directed to any other portion requiring lubrication, such as a cam face of the cam of the valve drive mechanism.

On the other hand, when the point on FIG. 11, which is determined by the engine speed N and the vacuum P is not in the region illustrated by the hatching, since the solenoid of the electromagnetic control valve 36 is deenergized, the electromagnetic control valve 36 shuts off the oil feed passage 35. At this time, since the lubricating oil in the oil pressure chamber 30 gradually flows out into the fuel return passage 41 via the choke passage 40, the piston 22 gradually moves downward and then shuts off the bypass passage 14. As mentioned previously, since the choke passage 40 is arranged above the oil distribution passage 34 and the oil pressure chamber 30, the oil distribution passage 34 and the oil pressure chamber 30 are filled with lubricating oil even if the piston 22 moves downward and reaches the lowermost position. Consequently, when the electromagnetic control valve 36 opens the fuel feed passage 35 again, the pressure in the oil pressure chamber 30 is instantaneously increased. Thus, the valve body 20 is able to instantaneously open the bypass passage 14. In FIG. 11, the region illustrated by the hatching indicates a region where the amount of air fed into the cylinder of the engine is large. Consequently, it will be understood that the slide valve 18 opens the bypass passage 14 when the amount of air fed into the cylinder of the engine is large, but the slide valve 18 shuts off the bypass passage 14 when the amount of air fed into the cylinder of the engine is small.

As mentioned above, when the engine is operating at a low speed under a light load, that is, when the amount of air fed into the cylinder of the engine is small, the slide valve 18 closes the bypass passage 14. At this time, the mixture introduced into the inlet passage portion A moves downward, while swirling, along the upper wall 13 of the helical portion B. Then, since the mixture, while swirling, flows into the combustion chamber 4, a strong swirl motion is created in the combustion chamber 4.

When the engine is operating at a high speed under a heavy load, that is, when the amount of air fed into the cylinder of the engine is large, since the slide valve 18 opens the bypass passage 14, a part of the mixture introduced into the inlet passage portion A is fed into the helical portion B via the bypass passage 14 having a low flow resistance. Since the flow direction of the mixture stream flowing along the upper wall 13 of the helical portion B is deflected downward by the steepling inclined wall D of the helix terminating portion C, a great vacuum is produced at the helix terminating portion C, that is, in the outlet opening 16 of the bypass passage 14. Consequently, since the pressure difference between the vacuum in the inlet passage portion A and the vacuum in the helix terminating portion C becomes great, a large amount of the mixture is fed into the helical portion B via the bypass passage 14 when the slide valve 18 opens. As mentioned above, when the engine is operating at a high speed under a heavy load, since the slide valve 18 opens, the entire flow area of the intake port 6 is increased, and a large amount of the mixture is fed into the helical portion B via the bypass passage 14 having a low flow resistance. As a result of this, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 becomes small and, thus, makes it possible to further increase a volumetric efficiency when the engine is operating at a high speed under a heavy load.

Figure 12:
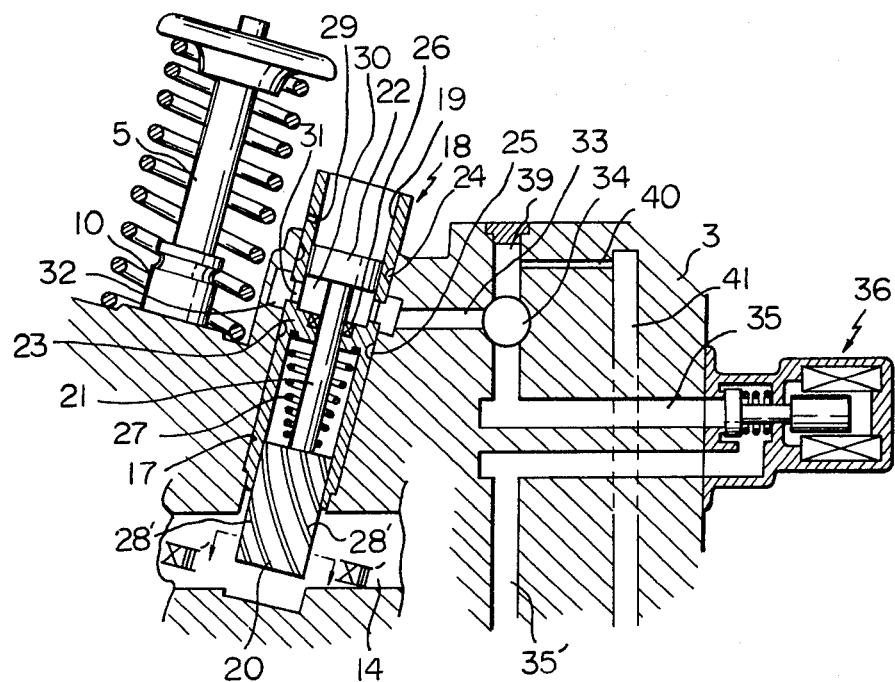
FIG. 12 is a cross-sectional side view of another embodiment according to the present invention.
Figure 13:
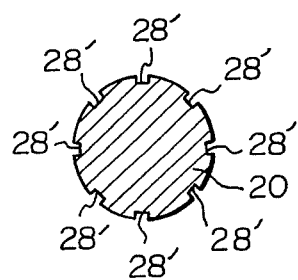
FIG. 13 is a cross-sectional view taken along the line XIII—XIII in FIG. 12.

FIGS. 12 and 13 illustrate another embodiment. In this embodiment, a plurality of air escaping grooves 28', spirally extending over the entire longitudinal length of the valve body 20, is formed on the outer circumferential wall of the valve body 20. In this embodiment, when the valve body 20 moves upward, air in the interior chamber of the hollow sleeve 19, which is formed between the valve body 20 and the partition 23, flows into the spiral air escaping grooves 28' and then is spouted into the bypass passage 14. At this time, since the air spouted from the spiral air escaping grooves 28' provides the rotational force for the valve body 20, the valve body 20 is rotated in the hollow sleeve 19. If the valve body 20 is rotated as mentioned above, the lubrication between the outer circumferential wall of the valve body 20 and the inner circumferential wall of the hollow sleeve 19 improves. As a result of this, since it is possible to prevent the occurence of the cutting operation of lubricating oil layer, which is caused by the deposition of fine particles contained in gasoline and by the desposition of carbon contained in the exhaust gas, it is possible to prevent the valve body 20 from adhering to the hollow sleeve 19.

Figure 14:
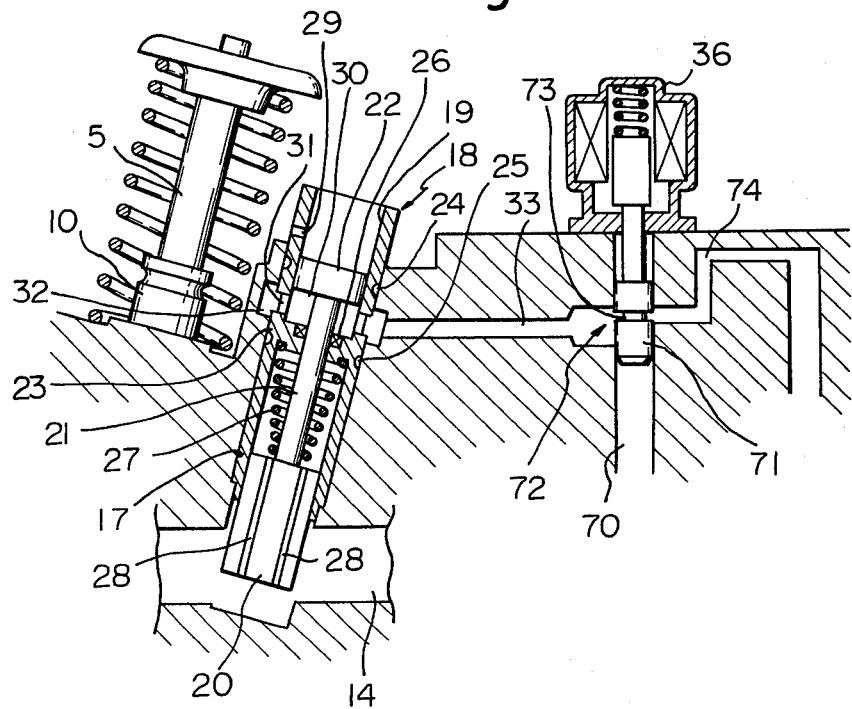
FIG. 14 is a cross-sectional side view of a further embodiment according to the present invention.

FIG. 14 illustrates a further embodiment. In this embodiment, the annular oil passage 32 formed around the hollow sleeve 19, is connected to the lubricating oil feed pump via the oil passage 33 and an oil feed passage 70. The electromagnetic control valve 36 has a valve body 71 actuated by the solenoid, and the valve body 71 is arranged in the joined portion 72 of the oil passage 33 and the oil feed passage 70. An annular groove 73 is formed on the outer circumferential wall of the valve body 71, and an oil return passage 74, which is connectable to the interior of the annular groove 73, is branched off from the joined portion 72. The oil return passage 74 is connected to the lubricating oil reservoir. From FIG. 14, it will be understood that a portion of the fuel return passage 74 is arranged above the oil pressure chamber 30 and the oil passage 33.

Figure 15:
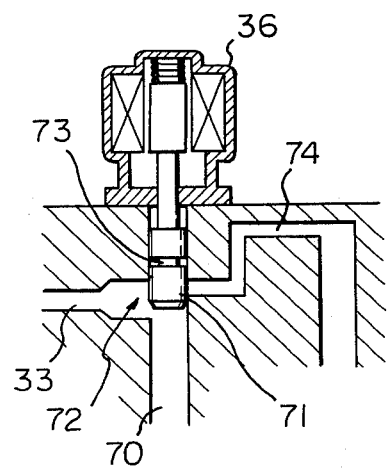
FIG. 15 is a cross-sectional side view of the flow control device illustrated in FIG. 14 and illustrating the case wherein the solenoid of the electromagnetic control valve is energized.

When the amount of air fed into the cylinder of the engine is large, the solenoid of the electromagnetic control valve 36 is energized. As a result of this, since the valve body 71 moves upward as illustrated in FIG. 15, lubricating oil under pressure is fed into the oil pressure chamber 30 via the oil feed passage 70 and the oil passage 33. Therefore, since the piston 22 moves upward, the valve body 20 opens the bypass passage 14. On the other hand, when the amount of air fed into the cylinder of the engine is small, since the solenoid of the electromagnetic control valve 36 is deenergized, the valve body 71 moves downward as illustrated in FIG. 14. As a result of this, since the oil pressure chamber 30 is disconnected from the oil feed passage 70 and connected to the oil return passage 74, the lubricating oil flows out from the oil pressure chamber 30 and then flows into the oil return passage 74 via the annular groove 73. Therefore, the piston 22 moves downward, and thus, the valve body 20 shuts off the bypass passage 14. Since a portion of the oil return passage 74 is arranged above the oil pressure chamber 30 and the oil passage 33, the oil pressure chamber 30 and the oil passage 33 are filled with lubricating oil. Consequently, when the valve body 71 of the electromagnetic control valve 36 moves upward as illustrated in FIG. 15, since a high pressure instantaneously acts on the oil pressure chamber 30, the valve body 20 is able to instantaneously open the bypass passage 14.

Figure 16:
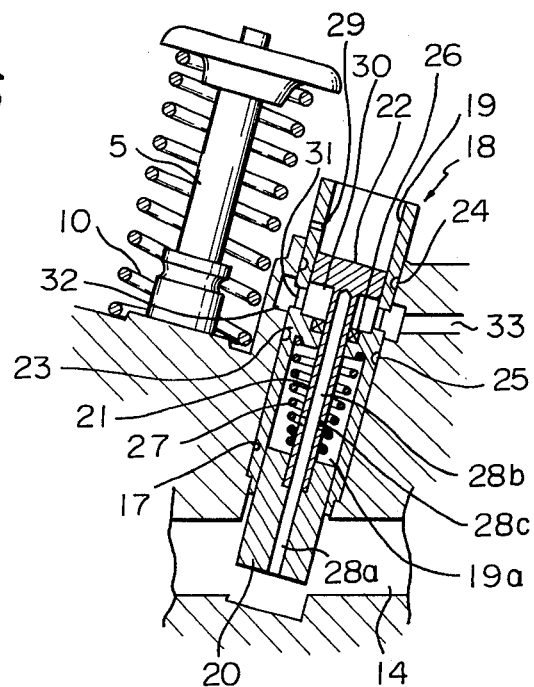
FIG. 16 is a cross-sectional side view of a still further embodiment according to the present invention.

FIG. 16 illustrates a still further embodiment. In this embodiment, an air escaping bore 28a is formed in the valve body 20 along the central axis thereof and connected to an air escaping bore 28b formed in the rod 21. In addition, air escaping holes 28c, interconnecting the air escaping bore 28b to the interior chamber 19a of the hollow sleeve 19, are formed on the rod 21. Consequently, the interior chamber 19a of the hollow sleeve 19 is connected to the bypass passage 14 via the air escaping holes 28c and the air escaping bores 28a, 28b.

In this embodiment, when the valve body 20 moves upward or downward, since the air-fuel mixture flows into the bypass passage 14 from the interior chamber 19a via the air bleed bores 28a, 28b or flows into the interior chamber 19a from the bypass passage 14 via the air bleed bores 28a, 28b without flowing between the outer circumferential wall of the valve body 20 and the inner circumferential wall of the hollow sleeve 19, there is no danger that fine particles contained in gasoline and carbon contained in the exhaust gas enter between the outer circumferential wall of the valve body 20 and the inner circumferential wall of the hollow sleeve 19. Therefore, it is possible to prevent the outer circumferential wall of the valve body 20 from being damaged by such fine particles and carbon, and it is also possible to prevent the valve body 20 from adhering to the hollow sleeve 19.

Figure 17:
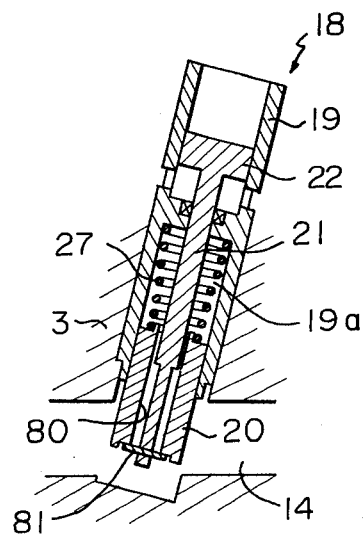
FIG. 17 is a cross-sectional side view of a still further embodiment according to the present invention.

FIG. 17 illustrates a still further embodiment. In this embodiment, a bore 80, having a diameter which is larger than the outer diameter of the rod 21, is formed in the valve body 20. In addition, a pin 81, which is in engagement with the bottom face of the valve body 20, is fixed onto the lower end of the rod 21. Consequently, since the interior chamber 19a of the hollow sleeve 19 is continuously connected to the bypass passage 14 via the bore 80, the valve body 20 is able to easily move upward, and it is possible to prevent the valve body 20 from adhering to the hollow sleeve 19. In addition, in this embodiment, there is an advantage that the frictional resistance between the valve body 20 and the hollow sleeve 19 is not increased even if the axis of the rod 21 is slightly offset from the axis of the valve head 20.

A conventional engine is normally provided with a lubricating oil pump driven by the engine. In the present invention, since the flow control of the bypass passage is carried out by using a lubricating oil discharged from such a lubricating oil pump, it is possible to reduce the manufacturing cost of a flow control device. In addition, by adopting a lubricating oil control system, it is possible to reduce the size of the slide valve, and thus, the slide valve can be easily assembled to the cylinder head even if the cylinder head has a small space on the top face thereof. Furthermore, in the present invention, when the electromagnetic control valve shuts off the oil feed passage, the oil pressure chamber of the slide valve is connected to the oil return passage. Consequently, at this time, even if the leakage of lubricating oil occurs in the electromagnetic control valve, since the leaked oil is returned to the oil return reservoir via the oil return passage, there is no danger than the slide valve opens the bypass passage. In addition, since a portion of the fuel return passage is arranged above the oil pressure chamber of the slide valve, the oil pressure chamber is continuously filled with lubricating oil. Consequently, when the electromagnetic control valve opens the oil feed passage, the slide valve is able to instantaneously open the bypass passage.

While the invention has been described with reference to specific embodiments chosen for purposes of illustration, it should be apparent that numerous modifications can be made thereto by those skilled in the art without departing from the spirit and scope of the invention.

I claim:

1. A device for controlling flow in a helically-shaped intake port of an internal combustion engine, said intake port comprising a helical portion formed around an intake valve, and a substantially straight inlet passage portion tangentially connected to the helical portion and having a helix terminating portion, said device comprising:

a lubricating oil source;

a bypass passage branched off from the inlet passage portion and connected to the helix terminating portion of the helical portion;

a normally closed slide valve having an oil pressure chamber therein and a valve body which is actuated in response to a change in the pressure of the lubricating oil in said oil pressure chamber and is able to project into said bypass passage for controlling a flow area of said bypass passage; and control means for controlling a fluid connection between said lubricating oil source and said oil pressure chamber in response to a change in an amount of air fed into the intake port to open said slide valve when said amount of air is increased beyond a predetermined value.

2. A device according to claim 1, wherein said lubricating oil source is a lubricating oil feed pump driven by the engine.

3. A device according to claim 1, wherein said bypass passage has an outlet opening which is open to the helical portion at a position near a top wall of the helical portion.

4. A device according to claim 3, wherein the top wall of the helical portion has a steeply inclined wall portion at the helix terminating portion, the outlet opening of said bypass passage being arranged near said steeply inclined wall portion.

5. A device according to claim 1, wherein the intake passage portion has an inlet open end located furthest from the helical portion, said bypass passage having an inlet opening which is open to the inlet passage portion at a position near said inlet open end.

6. A device according to claim 5, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

7. A device according to claim 6, wherein the intake port comprises a valve guide projecting into the helical portion from an upper wall of the helical portion and having a circumferential wall, said downwardly inclined portion being tangentially connected to the circumferential wall of said valve guide.

8. A device according to claim 1, wherein said control means comprises an oil feed passage for feeding lubricating oil into said oil pressure chamber from said lubricating oil source, an oil return passage for discharging lubricating oil from said oil pressure chamber, and a control valve device actuated in response to the change in said amount of air for feeding lubricating oil into said oil pressure chamber from said oil feed passage when said amount of air is larger than the predetermined value, said oil return passage having a passage portion located at a position which is higher than that of said oil pressure chamber.

9. A device according to claim 8, wherein said passage portion has a cross-sectional area which is smaller than that of the remaining portion of said fuel return passage.

10. A device according to claim 8, wherein said control valve device is arranged in said fuel feed passage, said oil pressure chamber being continuously connected to said oil return passage.

11. A device according to claim 8, wherein said oil feed passage and oil return passage are joined with each other, said control valve device being arranged at the joined portion of said oil feed passage and said oil return passage for selectively connecting said oil pressure chamber to said oil feed passage or said fuel return passage.

12. A device according to claim 8, wherein said control valve device comprises an engine speed sensor detecting the engine speed and producing a detecting signal, a vacuum sensor detecting the level of vacuum in the intake port and producing a detecting signal, an electromagnetic control valve controlling the feeding operation and the discharging operation of lubricating oil, and an electronic control unit controlling said electromagnetic control valve in response to the detecting signals of said engine speed sensor and said vacuum sensor.

13. A device according to claim 1, wherein said slide valve comprises a stationary hollow sleeve having a partition therein, a piston slidably inserted into said hollow sleeve and defining said oil pressure chamber between said piston and said partition, and a rod extending through said partition and connected to said piston at one end thereof, said valve body being slidably inserted into said hollow sleeve and connected to the other end of said rod.

14. A device according to claim 13, wherein said hollow sleeve has an opening cooperating with said piston and connected to said oil pressure chamber when said opening is uncovered by said piston for restricting the uppermost position of said piston.

15. A device according to claim 14, wherein the engine has a cylinder head having a top face, said hollow sleeve having a portion which projects from the top face of said cylinder head, said opening being arranged on the portion of said hollow sleeve and directed to the top face of said cylinder head.

16. A device according to claim 13, wherein said valve body has a air escaping passage interconnecting said bypass passage to an interior chamber of said hollow sleeve, which is formed between said valve body and said partition.

17. A device according to claim 16, wherein said air escaping passage is a bore extending through said valve body and said rod.

18. A device according to claim 16, wherein said air escaping passage is a bore extending through said valve body and having a diameter which is larger than the outer diameter of said rod, said rod extending through said bore and having a pin which is in engagement with said valve body.

19. A device according to claim 16, wherein said air escaping passage is a plurality of grooves formed on an outer circumferential wall of said valve body and extending over the entire longitudinal length thereof.

20. A device according to claim 19, wherein each of said grooves is a spiral groove spirally extending on the outer circumferential wall of said valve body.

* * * * *